Sept. 24, 1940.        O. K. OWEN         2,215,617
APPARATUS FOR BULBING GREENHOUSES
Filed Oct. 25, 1937
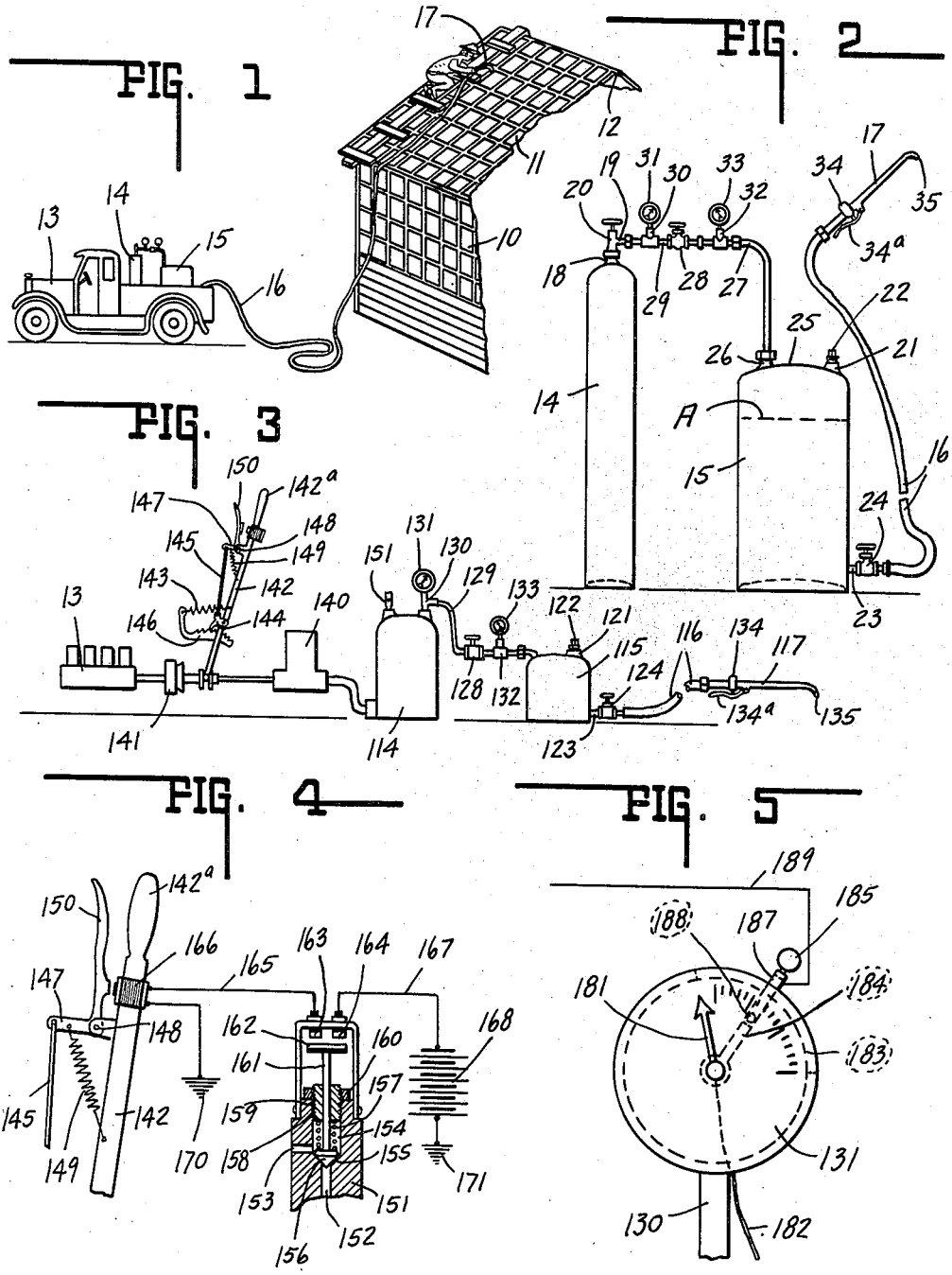
INVENTOR.
ORLANDO KEITH OWEN,
BY Lockwood Goldsmith & Galt
ATTORNEYS.

Patented Sept. 24, 1940

2,215,617

UNITED STATES PATENT OFFICE 2,215,617

APPARATUS FOR BULBING GREENHOUSES

Orlando Keith Owen, Terre Haute, Ind.

Application October 25, 1937, Serial No. 170,907

1 Claim. (Cl. 230—15)

This invention relates to the improved method of and apparatus for the expeditious bulbing of green houses and the like.

Heretofore in the bulbing of greenhouses, the accepted practice has been to have a container with semi-liquid bulbing material readily available and a workman nearby who would open the empty bulbs, fill the same with the bulbing material, reclose the bulbs and then pass the bulbs to the workmen who would discharge the material therefrom. If the material were relatively more liquid than solid the workmen instead of using separable bulbs, would merely insert the tip of the bulb, which in shape was what might be termed an oversize ear syringe, into the semi-liquid and suck the material into the bulb. It is quite apparent this process involves considerable manual labor and is exceedingly expensive.

The hand application of this material is subject to variations in hand pressure applied.

The chief object of the invention is first to permit a substantial continuous bulbing operation to be effected, although under the control of the operator applying the bulbing material to such portions of the greenhouse, or the like, which require bulbing or rebulbing, and second application of the material at a regulated high pressure which insures complete filling of the space between the glass and sash bars under that pressure best for handling the material dependent on its viscosity and outside temperature conditions.

In explanation of the term "bulbing" it may be stated that this in effect is the application of a waterproof putty-like substance in semi-liquid condition to the joint between the glass panes or between the glass and adjacent frame for waterproofing and substantially air-leak proofing the connection therebetween.

When it is noted that greenhouses have the ridges thereof positioned anywhere from ten to twenty five feet above the ground level and anywhere from ten to twenty five feet from the side wall and the mid-portion may be fifty to one hundred feet from the ends (dependent on greenhouse length), it is quite apparent that the passing of bulbs from the bulb filling station to the operator on the greenhouse applying the bulbing material and the subsequent return of the empty bulbs, is quite laborious.

The present invention over the standard practice may, merely by way illustrating one important advantage, be compared to the putting out of a fire by a high pressure water system compared to the putting out of a fire by a bucket brigade.

Other advantages of the same invention will be pointed out hereinafter.

The chief feature of the invention consists in providing a source of pressure and associating therewith a closed chamber containing the bulbing material and connected to said source of pressure so that the material is discharged from the chamber by the pressure applied thereto and this discharged material is conveyed through an elongated conduit or hose to a discharge nozzle manipulated by the operator at the point of application of the bulbing material.

Other features and objects of the invention will be pointed out hereinafter.

The full nature of the invention will be understood from the accompanying drawing and the following specification and claim:

In Fig. 1 of the drawing, there is diagrammatically illustrated a portion of a greenhouse, an operator thereon, a self-propelled vehicle containing a source of pressure, a chamber containing the bulbing material, and an elongated flexible conduit extending from the vehicle and connected to the chamber and terminating in a nozzle held by the operator at the point of application of the material.

Fig. 2 is a diagrammatic elevational view of one form of apparatus suitable for practicing the continuous high pressure process.

Fig. 3 is a diagrammatic elevational view of another form of the invention.

Fig. 4 is an enlarged elevational view of the power control mechanism and the remote control therefor, the latter being shown in central section.

Fig. 5 is an elevational view of a modified form of remote control.

In the drawing 10 indicates the side wall of a greenhouse, 11 the roof and 12 the ridge thereof. 13 indicates a motor vehicle having a suitable source of power therein and a storage compartment in which is stored a source of pressure, such as a tank 14 and a source of bulbing material, such as a closed container or chamber 15. A conduit 16 in the form of a hose or the like which may be armored or otherwise, constitute a flexible conduit leading from the chamber 15 and terminates in the nozzle indicated generally by the numeral 17 and held by the operator at the point of application of the material.

Bulbing of greenhouses is necessary whenever glass replacement is required, for example, following a damaging hail storm or tornado and usually in the northern states is required annually before the Fall or Winter season as a maintenance matter, although in other latitudes it may at other intervals. As stated, this bulbing is to prevent the escape of heat and prevent the entrance of cold air and/or moisture into the interior of the greenhouse.

Reference will now be had to Fig. 2 wherein like numerals indicate like parts heretofore mentioned. The container 14 or source of pressure, may consist of a carboy or cylinder of compressed gas or air, the neck 18 of which is provided with the usual discharge outlet 19 and the control valve 20. The container 15 includes a filling opening 21 closed by a plug 22 and an outlet 23 which is controlled by a valve 24. Adjacent to or in the head portion 25 of the chamber 15 is a pressure intake 26. A conduit 27 is connected at one end thereto and is connected at its opposite end to a reducing valve 28. The reducing valve in turn is connected by the conduit 29 to the discharge 19 of the source of pressure. The conduit 29 includes a branch 30 provided with a pressure gauge 31. Conduit 27 includes a branch 32 provided with a pressure gauge 33.

The nozzle 17 includes a valve 34 which is normally constrained to closed position but which upon depression of handle 34a by the operator permits the hose 16 to discharge bulbing material through the tip 35 of the nozzle.

It is to be understood the pressure in the tank 14 is materially higher than the pressure utilized in the tank 15. The gauge 31 indicates the supply pressure. This may, if desired, be regulated by the valve 20. Usually, however, valve 20 is fully opened so that then gauge 31 registers tank pressure.

Preferably, there is provided the reducing and regulating valves 28 so that the gauge 33 registers at all times the pressure applied to the conduit 27 and through the intake 26 to the top of the bulbing material, indicated at A in Fig. 2 and in the tank 15. This pressure discharges the semi-liquid bulbing material through the discharge 23 and the amount thereof or rate of discharge may be regulated by the valve 24. This valve also serves as a cutoff whenever it is desired to cease operations for a considerable period of time. Normally, cessation of operation to permit movement of the operator from one bulbing location to another adjacent thereto is controlled solely by the valve 34. The entire flow of the bulbing material is caused by the pressure applied to container 15 derived from the source of pressure 14. This pressure overcomes the friction in the conduit 16 and the effect of gravity providing valves 24 and 34 are opened to the desired degrees.

Whenever the supply of bulbing material becomes exhausted in the container, the valve 24 is closed, the valve 28 is closed, the plug 22 is removed, and then bulbing material is supplied to chamber 15. When a sufficient amount has been supplied to the chamber, the plug 22 is replaced and closed and then several closed valves 28 and 24 are opened.

Whenever it is desired to renew the source of pressure in the embodiment of the invention shown in Figs. 1 and 2, the valve 28 is closed, the connection between the discharge outlet 19 and the conduit 28 is disassociated in the usual manner and then a new cylinder of compressed gas or air is substituted for the one previously utilized. Following reconnection, the valve 28 is adjusted for the pressure desired. The operator then has full control over the discharge by reference to the gauges 31 and 33, and the valves 24 and 34.

The nozzle 17 as illustrated has a tip portion so that the operator can readily direct the material discharged into the space between the glass and sash. Furthermore, the discharge opening in the tip portion is of such form that the material as "layed down" has a decided crown which is highly desirable for the shedding of water, for example.

In Fig. 3 there is illustrated another form of the invention. In this form of the invention, instead of an independent pressure cylinder, there is provided a tank 114 which is suitably connected to a compressor 140 arranged for operation by a suitable source of power. An electric motor supplied by the vehicle battery may be such source of power. In the present instance, the engine used for propelling the vehicle shown in Fig. 1 is illustrated as the source of power and consequently, there is provided a clutch mechanism 141 for connecting the engine to the compressor for operation thereof.

This clutch is controlled by a lever—see Figs. 3 and 4—indicated by the numeral 142. It is normally constrained into on-clutching position by a return spring 143. It is locked, however, in the clutching position by the dog or tooth 144 controlled and if desired, carried by the rod 145 in turn mounted on the control handle 142. The tooth 144 is adapted to engage the ratchet 146 and is retained thereby in the adjusted position. The rod 145 is connected at its upper end to a bellcrank 147 pivoted at 148 on the handle 142. A locking spring 149 normally constrains the bellcrank into tooth and ratchet engaging position.

The bellcrank includes an extension 150 which terminates adjacent the hand gripping portion 142a of the handle 142, so that when two portions 142a and 150 are actuated, lever 142 may be adjusted into proper position to insure connection of the engine to the compressor for supplying pressure to the tank 114. When it is desired to manually release the engine, this may be readily accomplished by actuating rod 145 in opposition to spring 149 and assisted by spring 143.

To prevent the operation of the compressor beyond the safe storage capacity of the reservoir 114, any suitable sort of automatic cutout or control may be provided. Herein in Fig. 4, there is illustrated an extension 151—see also Fig. 3—which includes a relief valve structure having passage 152 in direct communication with the interior of the reservoir 114 and the lateral passage or relief port 153. Chamber 154 in communication with booth includes the valve seat 155. The valve 156 is normally constrained toward seated position by the spring 157, the force of which is adjusted by the threaded sleeve 158 in the threaded opening 159 of the body portion of the relief valve and the position thereof, if desired, may be locked by the nut 160.

The valve 156 includes a stem 161 that extends through the sleeve portion and terminates in a switch member 162 insulated therefrom. When the valve is elevated by the reservoir pressure exceeding the spring pressure, the switch member 162 bridges the contacts 163 and 164. One contact (163) is connected by line 165 to a solenoid 166 carried by the handle 142. This solenoid is arranged to tilt the lever 147 in opposition to spring 149 so that the tooth 144 is disengaged from the ratchet. Thereupon lever 142 is immediately returned to the position corresponding to clutch disengaged positioning by the main return spring 143. The other contact 164 of the aforesaid switch is connected by line 167 to a suitable source of electrical energy such as a storage battery 168 upon the vehicle. The solenoid and storage battery are suitably connected together electrically as indicated by the ground connections 170 and 171, respectively.

Another form of automatic and remote control is illustrated in Fig. 5. This form is associated with the so-called high pressure gauge 131 having the conduit 130 arranged for connection either to the reservoir 114 or to the line 129—see Fig. 3.

In Fig. 5 numerals of the one hundred series similar to those utilized in Figs. 1 and 2, indicate like or similar parts. In this figure the gauge 131 is shown provided with an indicating finger or arrow 181 responsive to the pressure in the reservoir 114 through the conduit 130. The finger also is in electrical connection by line 182 with a source of electrical energy such as for example, the battery 168 shown in Fig. 4. The gauge has an arcuate opening, for example, 183 in a portion of its periphery. Pivotally associated with the indicator 181 is an arm 184 terminating in a finger piece 185 to permit the arcuate adjustment of said arm. The arm includes an extension 187 that extends inwardly through the arcuate slot and terminates such that if the pressure be sufficiently great, the indicator 181 or the "live" portion thereof is adapted to engage the contact portion 188 of the supplementary arm 187 to complete a circuit to the solenoid 166, for example, shown in Fig. 4, through the line 189 from the battery by way of line 182.

In either of these remote control forms of the invention, it will be understood that the reservoir cannot be charged to that pressure which is excessive, having due regard to the factor of safety or capacity of the reservoir 114. If desired, there may be associated with line 189 or the line 165, a remote control device for positively stopping the engine. However, this type of control is additional to that illustrated and is mentioned herein merely to describe a complete automatic control or cutoff of power.

It is to be understood that the operator utilizing the nozzle will be immediately apprised of an insufficiency of pressure by the failure of material to freely flow from the nozzle so that the operator then need only descend and start the engine to insure replenishing of the pressure. The capacity of the reservoir preferably would be sufficient to supply material continuously to the nozzle for a period of from four to five hours so that it would only be necessary to recharge the reservoir when starting in the morning and/or during the lunch period.

While the invention has been described in great detail in the foregoing description, the same is to be considered as illustrative and not restrictive in character. The various modifications hereinbefore described as well as others which will readily suggest themselves to persons skilled in this art, are all considered to be within the broad scope of this invention, reference being had to the appended claim.

The invention claimed is:

In a bulbing machine having a source of power, a compressor unit, a clutch therebetween, and a pressure tank, cut-out means for automatically disengaging said clutch upon a predetermined pressure being reached in said tank, said means comprising a pressure responsive valve associated with said tank, a dog and ratchet arrangement for normally restraining said clutch in engaged relation, resilient means operable upon release of said dog to disengage said clutch, a source of electric current, an electromagnet in circuit therewith and operatively associated with said dog, and means associated with said valve whereby said valve operates to close the circuit upon pressure responsive movement.

ORLANDO KEITH OWEN.